United States Patent
Lifshits et al.

[15] 3,684,856
[45] Aug. 15, 1972

[54] RESISTANCE BUTT WELDING MACHINE

[72] Inventors: Viktor Senderovich Lifshits, Karkazsky bulvar, 21, korpus 2, kv. 41, Moscow; Viktor Ivanovich Grigoriev, Poselok Lvorsky, Sadovy proezd, 4, kv. 47, Moskovskaya Oblast; Georgy Nikolaevich Petrov, Izmailovsky bulvar, 34/32 kv. 8; Oleg Sergeevich Papkov, Samarkardsky bulvar, 24, korpus 3, kv. 3, both of Moscow, all of U.S.S.R.

[22] Filed: June 28, 1971

[21] Appl. No.: 157,492

[52] U.S. Cl. .................219/97, 219/100, 219/101, 219/104
[51] Int. Cl. ...................B23k 11/02, B23k 11/04
[58] Field of Search.............219/97, 100, 101, 104

[56] References Cited
UNITED STATES PATENTS 2,018,380  10/1935  Pfeiffer.................219/104
3,387,761  6/1968  Pickard.................219/101 X Primary Examiner—R. F. Staubly
Attorney—Holman & Stern

[57] ABSTRACT

A machine for [the] resistance butt welding of articles, such as pipes, [featuring] having a welding transformer and two pipe clamps, and an additional pipe clamp located at a distance from one of the [available] first two clamps, [the rigid attachment of the extreme clamps to] a common shaft made up of two [halves as well as rigid fixation of the] lengths joined and secured rigidly to the extreme pipe clamps, a casing of an actuating cylinder rigidly fixed to the intermediate clamp and [of the cylinder piston -] to said shaft.

1 Claim, 1 Drawing Figure

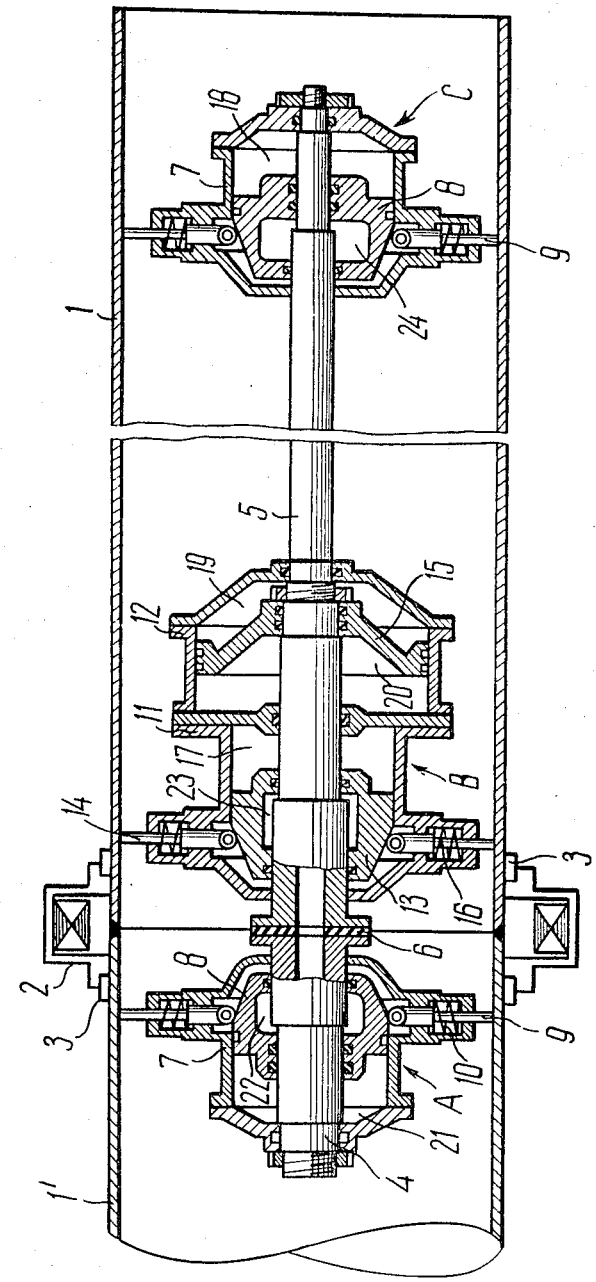

RESISTANCE BUTT WELDING MACHINE

The present invention relates to a machine for flash butt welding of articles, particularly short lengths of pipes, to obtain extended sections or a continuous pipe line; it can find application in the construction of main or gas-and-oil-field pipelines in gas and oil industries.

Known in the prior art are machines for resistance welding of pipelines, incorporating a welding transformer, two clamps located at a distance from the pipe ends to be welded, and a hydraulic cylinder which serves for bringing together the clamped pipes during the welding operation.

In using said machine for pipe welding the welding transformer and the clamps are placed inside of the pipe lengths to be welded.

Also known are machines for the resistance butt welding of pipes in which the welding transformer is arranged outside of the pipe embracing it, whereas the clamps designed for aligning and engaging the pipes during the welding procedure are located inside (see USSR author's Certificates Nos. 136,487 and 182,266, cl.21h, 29/10).

A drawback of the said machines resides in the need for a high-duty pump to be incorporated in the machine hydraulic system in order to provide the high upset rate and adequate pressure ensuring a given upset force.

Where the hydraulic systems with low-output pumps are employed said systems should be complemented by hydraulic accumulators, which allow for a high initial upset speed but, such arrangements result in intricate design of the machine hydraulic system.

Nevertheless in the welding machines of the second type both the average upset speed and its final value are rather small which in certain cases is inconducive to obtaining the welded joints of the requisite quality.

In addition, the erection of high-duty and high-pressure pumps in the machines designed for field welding presents a problem due to limitations on dimensions and rating of a mobile power plant supplying power to both the welding transformer and motor drive of the said welding machine.

The object of the present invention is to eliminate the above mentioned disadvantages.

The present invention is in essence aimed at developing a resistance butt welding machine ensuring the requisite high upset rate.

The present invention provides a machine for resistance butt welding of articles, such as pipes, which machine comprises a welding transformer, two clamps, located at a distance from the pipe ends to be welded, and an actuating cylinder for the bringing together and separating of the clamped pipes during the welding operation, said machine being fitted, in conformity to the present invention, with an additional and third clamp placed at a distance from one of the set of said first two clamps, the extreme clamps being permanently set up on a shaft made up of two halves and with the casing of the actuating cylinder being fixed to the intermediate clamp while the cylinder piston is fixed to the said shaft.

The essence of the present invention will become more fully apparent from a consideration of the following description and the accompanying drawing which pictorially illustrates a resistance welding machine in conformity with the present invention shown in a longitudinal cross-sectional view.

The machine illustrated in the drawing is so arranged relative to pipes 1 and 1' to be welded that clamps A, B and C will be located inside of said pipes whereas welding transformer 2 with current-conducting contacts 3 will embrace the pipes.

Clamps A, B and C are interconnected by a common shaft made up of two halves 4 and 5 separated by insulator 6.

The extreme clamps A and C are similar in design, comprising each the following components: cylindrical casing 7 rigidly coupled to the shaft half 4 or 5 respectively, cone-shaped piston 8, radially located centering elements 9 resting on piston 8 and back springs 10 acting on centering elements 9.

Clamp B consists of cylindrical casing 11 capable of moving with respect to the shaft half 5 and rigidly coupled to the housing of hydraulic cylinder 12, of cone-shaped piston 13, centering elements 14, piston 15 rigidly coupled to the shaft half 5 and back springs 16.

The proposed resistance butt welding machine operates as follows.

Clamps B and C are located in one of the pipes to be welded (pipe 1).

Into cavity 17 of clamp B and cavity 18 of clamp C pressure oil is fed.

As casing 7 of clamp C is rigidly coupled to the shaft half 5, cone-shaped piston 8 starts moving to the left causing centering elements 9 to separate radially.

At the same time pressure oil is supplied into cavity 17 of clamp B which forces tapered piston 13 to move to the left. During that travel the cone of piston 13 interacting with centering elements 14 clamps pipe 1 end to be welded.

However at the moment when pipe 1 is gripped by clamp B its casing 11 remains stationary as the oil from the left- and right-hand side of piston 15, enclosed in cylinder 12, is locked.

As soon as pipe 1 is gripped by clamps B and C pressure oil is fed into cavity 19 of hydraulic cylinder 12 and discharged from its cavity 20.

As a result the section of pipe 1 between centering elements 9 and 14 of clamps B and C respectively will be compressed and the shaft half 5 stretched within the limits of elastic deformation. The length of the shaft half 5 is chosen so that its elongation along with the shortening of the pipe in the field of the elastic strain would exceed the value of the pipe movement during the welding procedure.

Besides, the difference between the pipe movement in the course of welding and the total change in the length of the shaft half 5 and compressed pipe 1 should provide the adequate amount of stored elastic energy necessary for obtaining the given upset force at the end of the welding process.

Next, pipe 1' is put on clamp A, moved forward to establish a reliable butt contact with pipe 1 and gripped by centering elements 9 of clamp A. The operation of clamps A and C is quite similar. As all three clamps A, B and C are located on coaxial and interconnected shafts 4 and 5, forming a common shaft, pipes 1 and 1' can be aligned and abutted.

After this state welding current is applied to pipes 1 and 1' with the aid of current-conducting contacts 3 of welding transformer 2 preparatory to welding of the pipes 1 and 1'.

Subsequently oil is discharged from cavity 19 into a tank in conformity with a preset schedule of the pipe movement during welding whereupon cavity 20 is filled with pressure oil fed from the tank.

In that instance pipes 1 and 1' are brought together on account of the elastic energy stored in the shaft half 5 and pipe 1.

As during upsetting the oil is discharged from cavity 19 into the tank when pipes 1 and 1' are being drawn together, the oil pressure in a drain pipe is very low, which makes it possible to enlarge the cross-section of the drain to a requisite size without increasing the wall thickness of the pipe and creating therefore a high upset rate.

Naturally, the oil is delivered into cavities 19 and 20 along other pipes having a small diameter.

As soon as the welding operation is completed the oil from cavities 17, 18 and 21 is discharged whereas cavities 22, 23 and 24 are filled with the oil.

As a result cone-shaped pistons 8 and 13 return to their original positions and centering elements 9 and 14, under the action of back springs 10 and 16, also come back to their initial positions releasing the clamped pipes.

What is claimed is:

1. A machine for electrical flash butt welding of articles, in particular pipes, comprising in assembly: a welding transformer, first and second clamps located at a distance from pipe ends of pipes to be welded and disposed inside of said pipes, an actuating cylinder which has a casing and a piston and arranged for bring together the clamped pipes during the welding operation; an additional third clamp also disposed inside one of the pipes and arranged at a distance from said second clamp, a shaft made up of two lengths with electrical insulation therebetween and carrying said first and third clamps securably disposed on the shaft with said cylinder casing being rigidly fixed to the second intermediate clamp and its said piston permanently coupled to the above shaft.

* * * * *